United States Patent Office 2,755,374
Patented July 17, 1956

2,755,374

REFLECTING SYSTEM

Walter Ott, Bern, and Max Oberholzer, Neuschloss, Einsiedeln, Switzerland

Application June 26, 1952, Serial No. 295,796

Claims priority, application Switzerland March 13, 1952

2 Claims. (Cl. 240—41.35)

It is known that searchlights have hitherto been exclusively designed in such a way that one or more sources of light are arranged in, or approximately in, the focus of a parabolic or conic-sectional mirror. All these constructions have the drawback that the spatial extension of the light source cannot be prevented. In addition, the light intensity of a single searchlight cannot be increased beyond the light intensities of the sources of light that can be concentrated approximately in the focus of the reflector. Besides that, a considerable part of the produced light is lost as stray light.

The invention is based on the principle of multiple reflection.

It is known that light- and other rays, which can be reflected according to optical laws and which in the extension of the focal rays of a rotation ellipsoid impinge on the suitably prepared surface thereof, are reflected as though they issued from the other focus of the same rotation ellipsoid. Based on this optical law, which may be demonstrated by the known theorems of stereometric geometry, it is possible to design searchlights whose sources of light are not arranged in the focus, or approximately in the focus of the reflector, but outside the reflector. It is only necessary that the rays, coming from at least one source of light, are guided by a suitable arrangement of collecting elements in such a way that they are directed to the focus of a rotation ellipsoid. This focus of the rotation ellipsoid should be so positioned that it does not coincide with the focus of the reflector.

If an auxiliary reflector is arranged around the focus of the main reflector, and if the light- and other rays are led in a suitable manner onto the outer convex surface of the auxiliary reflector, reflection takes place there as though the rays would emanate from the focus of the main reflector, i. e. a focus is thus created that is not real but imaginary.

An alteration of the angle at which the rays issue from the whole reflecting system may be effected in that the auxiliary reflector located within a paraboloid main reflector, or the paraboloid main reflector itself, or the sources of light, or even the collecting elements associated with the sources of light, may be designed displaceable in any desired direction of space, either each of these alone, or in combination with each other.

The accompanying sectional drawings show by way of example preferred forms of embodiment. All these drawings show the paraboloid main reflectors usually employed as reflectors of parallel rays.

Figure 2:
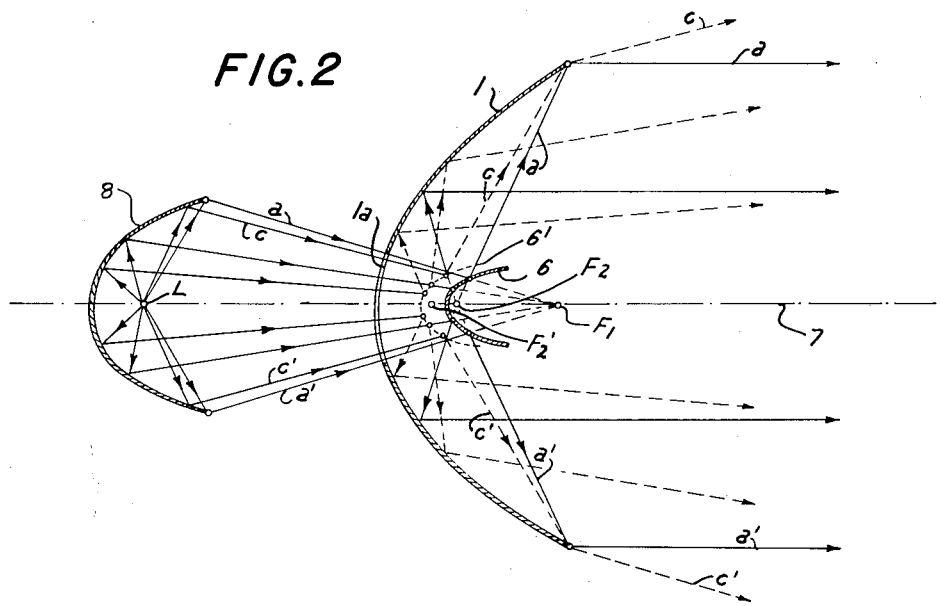
Fig. 2 is a schematic sectional view of another embodiment of the invention.

Referring to Fig. 2, the rays from the ray source L are sent out in all directions and are reflected by the reflector 8 to pass through a central opening 1a of the main reflector 1 and to be collected (or condensed) in the second focus $F_1$ of the rotation ellipsoid 8. The ray path $a$, $a'$ identifies the outer limit of this cone of rays. This focal or condensing point $F_1$ must not coincide with the finite focus $F_2$ of the paraboloid or conoidal reflector body. The two foci $F_1$ and $F_2$ are at the same time the foci of a rotation ellipsoid. By the reflection of the rays coming from the reflector elements and impinging on the suitably prepared external surface of the rotation ellipsoid 6, these rays are thrown back against the inner surface of the paraboloid reflector 1, just as though they were originating from the focus of the paraboloid reflector 1, a focus which is at the same time the other focus of the rotation ellipsoid, and obtaining the effect of an absolutely point-shaped source of rays, located simultaneously in the focus of the paraboloid and of the ellipsoid. The focus $F_1$ of the paraboloid reflector 1 that coincides with one focus of the ellipsoid 6 thus forms an imaginary point-shaped source of light and other rays. The rays reflected on the outer surface of the ellipsoid reflector 6 necessarily fall onto the inner surface of the paraboloid at such an angle that they will be reflected there so as to run parallel to the central axis of the paraboloid after this reflection.

Figure 1:
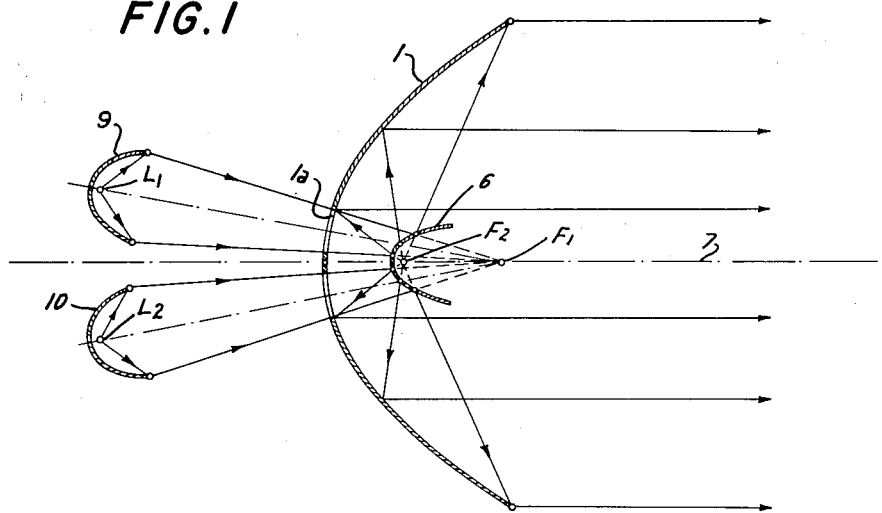
Fig. 1 is a schematic sectional view of one embodiment of the invention.

Fig. 1 shows an embodiment with two sources of rays $L_1$ and $L_2$. By suitable reflector means 9 and 10 the rays emitted from these sources are all reflected through opening 1a toward focus $F_1$ of the auxiliary elliptic reflector 6. Since the other focus $F_2$ of reflector 6 coincides with the finite focus of the parabolic reflector 1, all rays coming from the ray sources will be reflected by the outer convex reflecting face of reflector 6 as if they came from the parabola focus $F_2$. In such manner all these rays are reflected on the parabolic surface 1 and parallel to the central axis 7 of the system.

Fig. 2 shows another embodiment with a single ray source L and only one reflecting elliptic element 8. The rays $a$, $a'$ and $c$, $c'$ are reflected by an auxiliary reflector 6 and 6' respectively, also of elliptic shape. The elliptic body 6 is so positioned that its two foci coincides with $F_1$ and $F_2$. In this condition, the rays $a$ and $a'$ will be reflected parallel to the central axis 7 by the parabolic main reflector 1. Upon displacement of the elliptic reflector 6 into position 6' on the central axis so that its foci no longer coincide with $F_1$ and $F_2$ and one of its foci is in position $F_2'$, the illustrated rays $c$ and $c'$ will then be reflected as though they no longer came from the displaced focus $F_2'$. Consequently the rays take a new direction upon reflection from the parabolic reflector 1, i. e. the rays no longer run parallel to the central axis 7, but they diverge.

The auxiliary elliptic reflector 6 disposed around the focus $F_2$ of the parabolic reflector 1 in Figs. 1 and 2 may be displaced at will to alter the direction of emergence and the angle of emergence of the rays from the whole system.

What we claim is:

1. A reflecting arrangement, comprising, in combination, a conoidal main reflector having an inner concave reflecting face having at least one finite focus and being formed with a central opening; an elliptic auxiliary reflector having an outer convex reflecting face, said auxiliary reflector being arranged on one side of and coaxial with said main reflector with said reflecting faces facing each other, and having one focus coinciding with said finite focus of said main reflector; two sources of rays located on the other side of said main reflector opposite said central opening; and two elliptic reflector means, each elliptic reflector means being arranged with one focus coinciding with one source of rays and having the other focus coinciding with the other focus of said auxiliary elliptic reflector so that rays emitted by said sources of rays pass in two conical beams through said central opening and are reflected by said convex reflecting face of said auxiliary elliptic reflector toward the reflecting face of said main reflector in a direction corresponding to rays emanating from said coinciding foci.

2. A reflecting arrangement comprising, in combination, a conoidal main reflector having an inner concave reflecting face having at least one finite focus and being formed with a central opening; an elliptic auxiliary reflector having an outer convex reflecting face, said auxiliary reflector being arranged on one side and coaxial with said main reflector with said reflecting faces facing each other and having one focus coinciding with said finite focus of said main reflector; at least one source of rays located on the other side of said main reflector opposite said central opening; and at least one elliptic reflector means arranged with one focus coinciding with said source of rays and having the other focus coinciding with the other focus of said auxiliary elliptic reflector so that rays emitted by said source of rays pass in a conical beam through said central opening and are reflected by said convex reflecting face of said auxiliary elliptic reflector toward the reflecting face of said main reflector in a direction corresponding to rays emanating from said coinciding foci.

References Cited in the file of this patent

UNITED STATES PATENTS

| | | |
|---|---|---|
| 1,278,026 | Salto | Sept. 3, 1918 |
| 1,469,690 | Smith | Oct. 2, 1923 |
| 2,342,115 | Blauvelt | Feb. 22, 1944 |
| 2,342,721 | Boerner | Feb. 29, 1944 |

FOREIGN PATENTS

| | | |
|---|---|---|
| 465,220 | France | Jan. 31, 1914 |
| 768,038 | France | July 30, 1934 |
| 47,127 | Netherlands | Nov. 15, 1939 |